(12) United States Patent
Salter et al.

(10) Patent No.: US 11,077,798 B2
(45) Date of Patent: Aug. 3, 2021

(54) VEHICLE EXTERIOR MONITORING

(71) Applicant: Ford Global Technologies, LLC, Dearborn, MI (US)

(72) Inventors: Stuart C. Salter, White Lake, MI (US); John Robert Van Wiemeersch, Novi, MI (US); Paul Kenneth Dellock, Northville, MI (US); Anthony Dwayne Cooprider, Rochester Hills, MI (US); Zeljko Deljevic, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 277 days.

(21) Appl. No.: 16/452,681

(22) Filed: Jun. 26, 2019

(65) Prior Publication Data

US 2020/0406821 A1 Dec. 31, 2020

(51) Int. Cl.
*B60R 1/074* (2006.01)
*B60R 1/12* (2006.01)
*G01V 3/08* (2006.01)

(52) U.S. Cl.
CPC ............. *B60R 1/074* (2013.01); *B60R 1/12* (2013.01); *G01V 3/08* (2013.01); *B60R 2001/1223* (2013.01)

(58) Field of Classification Search
CPC ... B60R 1/074; B60R 1/12; B60R 2001/1223; B60R 1/078; G01V 3/08; G01V 3/06
See application file for complete search history.

(56) References Cited

U.S. PATENT DOCUMENTS

| | | | |
|---|---|---|---|
| 6,204,753 B1 * | 3/2001 | Schenk | ............ B60R 1/062 340/435 |
| 6,879,250 B2 | 4/2005 | Fayt et al. | |
| 8,791,801 B2 | 7/2014 | Aubry | |
| 9,134,585 B2 | 9/2015 | Tonar et al. | |
| 9,797,179 B2 | 10/2017 | Washeleski et al. | |
| 2011/0074958 A1 * | 3/2011 | Pastrick | ............ B60Q 1/48 348/148 |
| 2020/0157873 A1 * | 5/2020 | Sabatini | ............ B60Q 1/323 |

FOREIGN PATENT DOCUMENTS

DE 102006012336 10/2017
JP 201225295 A 2/2012

OTHER PUBLICATIONS

"Building a Capacitive Proximity Sensor using Electric Paint", Bare Conductive, https://www.bareconductive.com/make/building-a-capacitive-proximity-sensor-using-electric-paint/.

* cited by examiner

*Primary Examiner* — Howard D Brown, Jr.
*Assistant Examiner* — Tyler B Edwards
(74) *Attorney, Agent, or Firm* — Frank Lollo; Bejin Bieneman PLC

(57) ABSTRACT

A vehicle side-view mirror assembly includes an anchor element mountable to a vehicle exterior, and a foldable housing, including a first surface directed in a forward direction when the foldable housing is in an unfolded position, a first capacitive cover and a first electric ground path attached to the first surface, a second surface that is a lateral side surface facing away from the anchor element, a second capacitive cover and a second electric ground path attached to the second surface, a third surface that is a hinged side surface hingedly connected to the anchor element, and a third capacitive cover and a third electric ground path attached to the third surface. Each of the capacitive covers are electrically insulated from one another.

14 Claims, 8 Drawing Sheets

VEHICLE EXTERIOR MONITORING

BACKGROUND

Vehicle exterior components such as side-view mirror assemblies may be impacted by an external object such as a pole, etc., as a vehicle navigates near a structure, e.g., a drive-through restaurant.

DETAILED DESCRIPTION

Introduction

Figure 1:
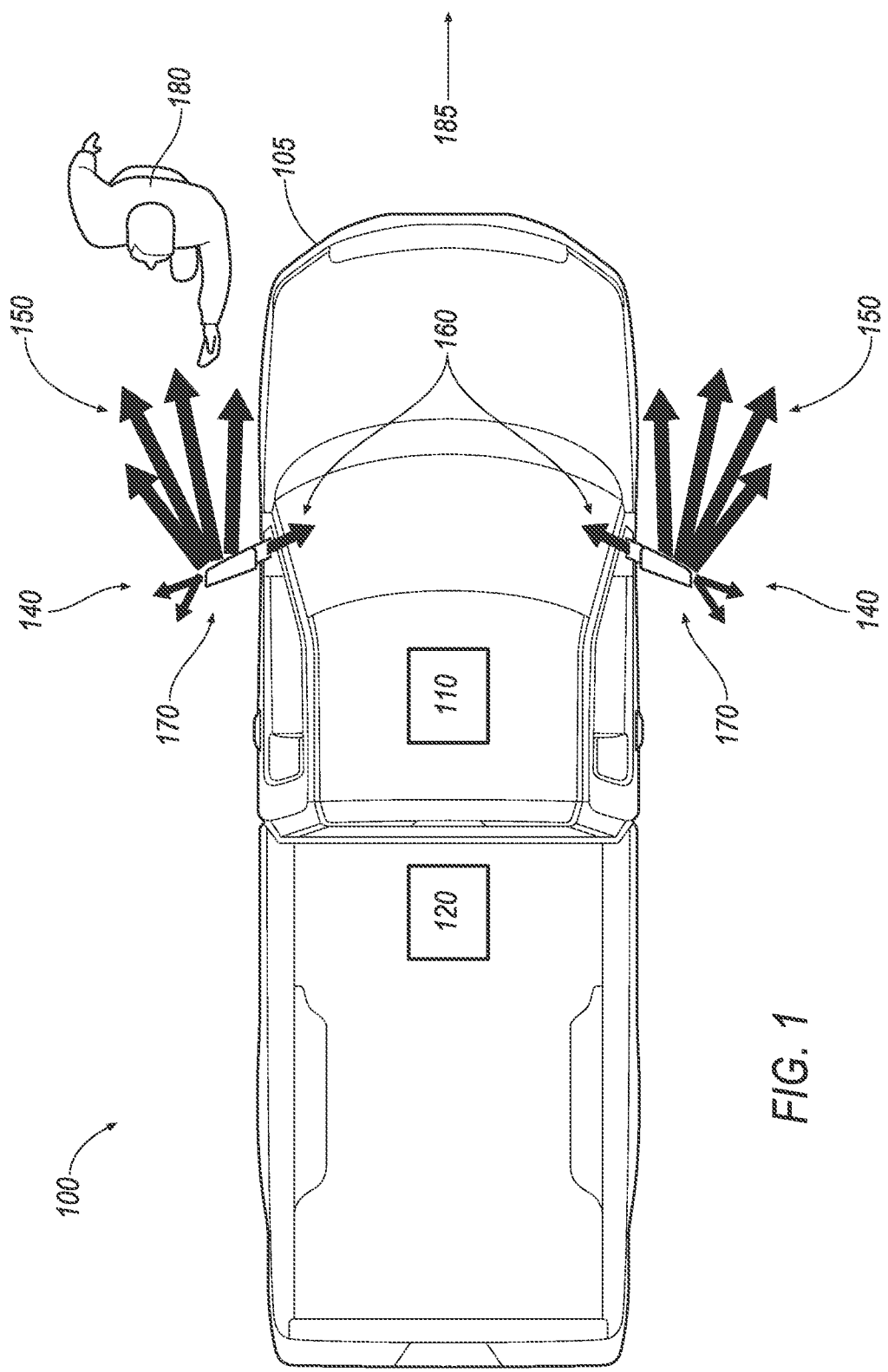
FIG. 1 illustrates an example vehicle with side-view mirrors with electric fields.

A vehicle side-view mirror assembly comprises an anchor element mountable to a vehicle exterior, and a foldable housing, including a first surface directed in a forward direction when the foldable housing is in an unfolded position, a first capacitive cover and a first electric ground path attached to the first surface, a second surface that is a lateral side surface facing away from the anchor element, a second capacitive cover and a second electric ground path attached to the second surface, a third surface that is a hinged side surface hingedly connected to the anchor element, and a third capacitive cover and a third electric ground path attached to the third surface, wherein each of the capacitive covers are electrically insulated from one another.

The hinged side surface may face a vehicle exterior surface when the housing is in the unfolded position and may face forward when the housing is in a folded position.

The capacitive covers and the electric ground paths may be electrically coupled to a vehicle computer.

The capacitive covers and the electric ground paths may be covered with paint.

Further disclosed herein is a system, comprising a side-view mirror assembly, comprising an anchor element mountable to a vehicle exterior, and a foldable housing, including a first surface directed in a forward direction when the foldable housing is in an unfolded position, a first capacitive cover and a first electric ground path attached to the first surface, a second surface that is a lateral side surface facing away from the anchor element, a second capacitive cover and a second electric ground path attached to the second surface, a third surface that is a hinged side surface hingedly connected to the anchor element, and a third capacitive cover and a third electric ground path attached to the third surface. Each of the capacitive covers are electrically insulated from one another, and a computer comprising a processor and a memory, the memory storing instructions executable by the processor to determine respective capacitances of each of the capacitive covers of the surfaces, and to actuate an actuator to move the housing to a folded position based on the determined respective capacitances.

The instructions may further include instructions to prevent an actuation of the foldable housing upon determining that a vehicle speed exceeds a threshold.

The instructions may further include instructions to actuate the foldable housing to fold upon determining that a rate of change of the determined capacitance is less than a first threshold and greater than a second threshold.

The instructions may further include instructions to detect water on the housing based on the determined capacitance and a rate of change of the capacitance.

The instructions may further include instructions to actuate a vehicle running board to drop upon (i) determining that a vehicle gear is on neutral position, (ii) detecting water on the foldable housing, and (iii) detecting water on a second foldable housing mounted to the vehicle.

The instructions may further include instructions to actuate a vehicle actuator to stop based on determined capacitance of the hinged side surface while the foldable housing is in the folded position.

The instructions may further include instructions to actuate the foldable housing to move to the folded position based on capacitances of the capacitive covers of at least one of the forward-facing surface and the lateral side surface.

The instructions may further include instructions to actuate an electric actuator to electrically charge and discharge the capacitive covers of the surfaces and to determine the capacitances of the covers based on a determined rate of discharge of the capacitances.

The instructions may further include instructions to actuate the actuator to move the housing to the folded position further based on location coordinates stored in the memory.

The instructions may further include instructions to store location coordinates in the memory upon determining that the housing was actuated to fold for at least a specified number of times at the respective location.

System Elements

A vehicle side-view mirror assembly is disclosed including an anchor element mountable to a vehicle exterior, and a foldable housing. The housing can include a first surface directed in a forward direction when the foldable housing is in an unfolded position, a first capacitive cover and a first electric ground path attached to the first surface, a second surface that is a lateral side surface facing away from the anchor element, a second capacitive cover and a second electric ground path attached to the second surface, a third surface that is a hinged side surface hingedly connected to the anchor element, and a third capacitive cover and a third electric ground path attached to the third surface. Each of the capacitive covers are electrically insulated from one another. A vehicle computer may be programmed to detect an object and actuate the foldable housing to fold (i.e., move to the folded position) based on a speed, direction, etc., of the object, thus preventing an object from impacting or colliding with the side-view mirror assembly.

FIG. 1 illustrates an example vehicle 100. The vehicle 100 includes a body 105, one or more computers 110, actuators 120, and one or more side-view mirror assemblies 140. Although illustrated as a truck, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle that operates in an autonomous (e.g., driverless) mode, a partially autonomous mode, and/or a non-autonomous mode.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., sensors, actuators 120, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

Figure 2:
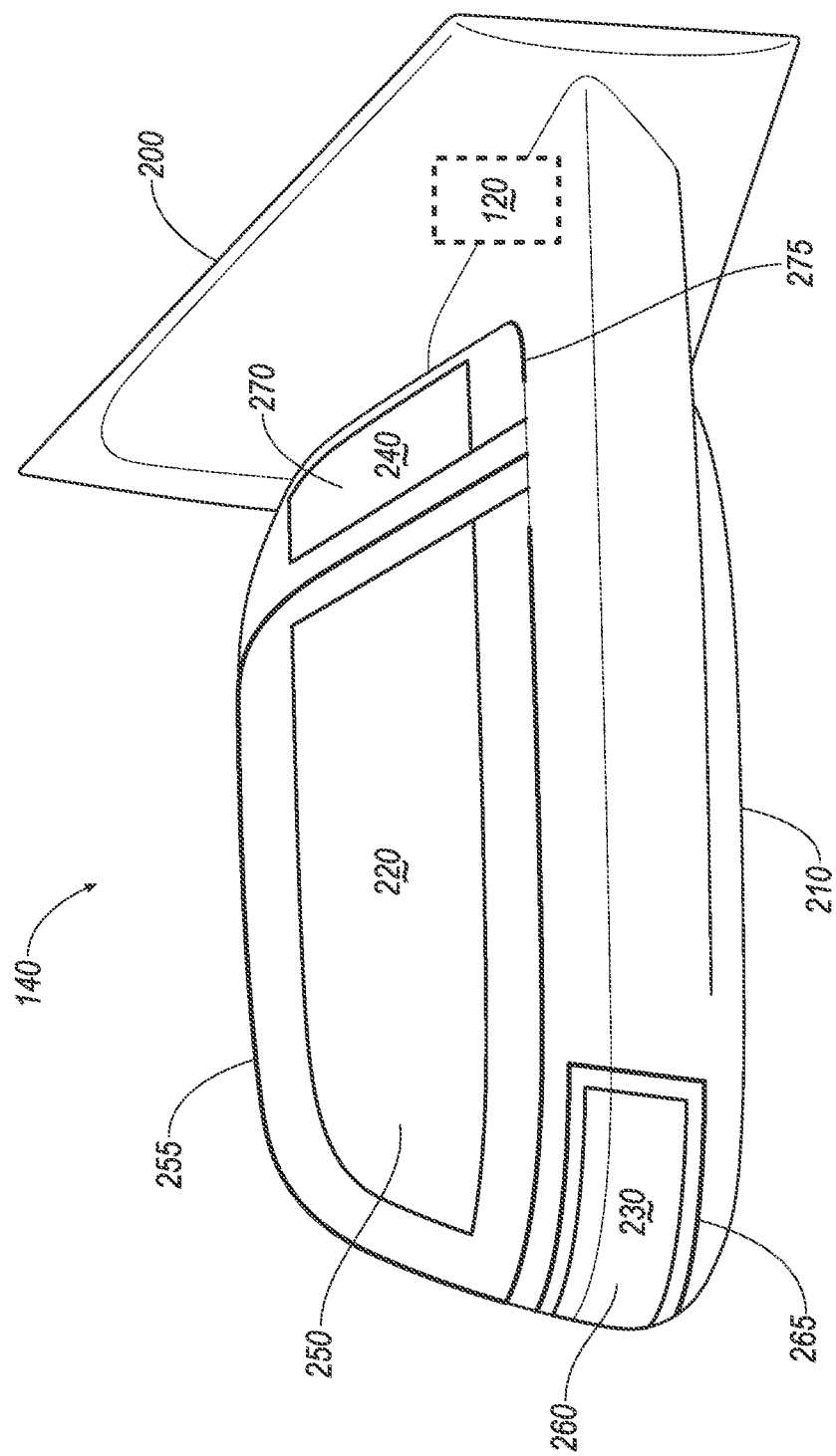
FIG. 2 illustrates a side-view mirror assembly with capacitive covers and electric ground paths.

The actuators 120 may be implemented via circuits, chips, or other electronic components that can actuate various vehicle subsystems in accordance with appropriate control signals as is known. The actuators 120 may be used to control braking, acceleration, and steering of the vehicle 100. As an example, the vehicle 100 computer 110 may output control instructions to control the actuators 120. The vehicle 100 may include actuators 120 to fold and/or unfold a side-view mirror housing 210 (FIG. 2). The vehicle 100 may include an actuator 120 to deploy a running board.

Vehicle 100 sensors may provide data encompassing at least some of an exterior of the vehicle 100, e.g., a GPS (Global Positioning System) sensor, camera, radar, and/or lidar (light imaging detection and ranging). The computer 110 may be programmed to detect object(s) 180 from data received from object detection sensors such as camera, radar, etc.

Figure 3A:
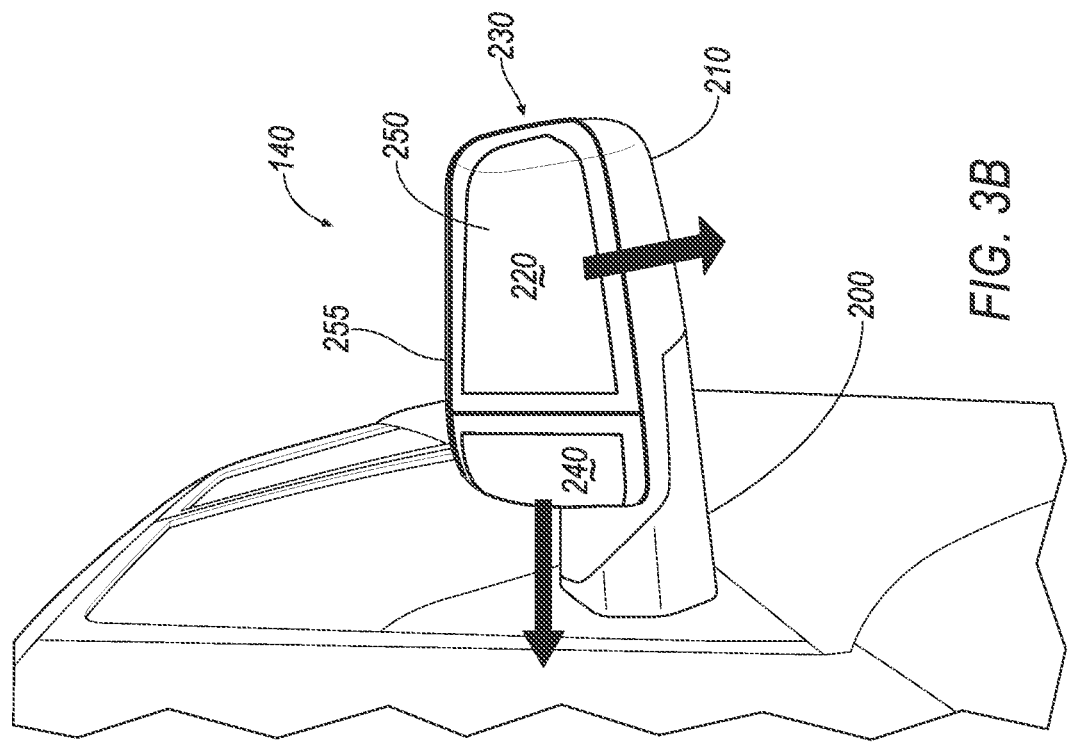
FIG. 3A shows the vehicle of FIG. 1 with the side-view mirror in the folded position.
Figure 3B:
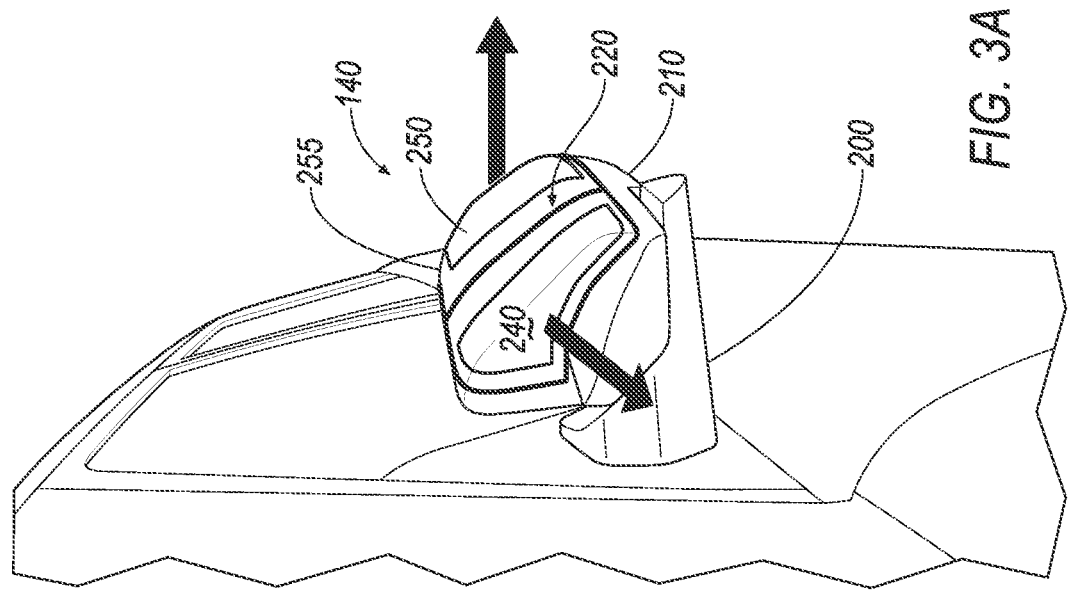
FIG. 3B shows the vehicle of FIG. 1 with the side-view mirror in the unfolded position.

The side-view mirror assembly 140 is mountable to a vehicle 100 body 105, e.g., an exterior of the body 105, a pillar, etc. The vehicle 100 may include a right side-view mirror assembly 140 and a left side-view mirror assembly 140. A mirror assembly 140 includes an anchor element 200 mountable to a vehicle 100 exterior, e.g., an exterior surface of the vehicle 100 body 105, and a foldable housing 210. The anchor element 200 may be formed of plastic, metal, etc., and may be mounted to the vehicle 100 body 105 via any suitable fastener, e.g., screws, bolts, etc. The foldable housing 210 may be formed of hard plastic and is hingedly attached to the anchor element 200. In one example, the housing 210 is a hollow plastic component that may include multiple parts that are mechanically attached to one another. The housing 210 has a folded position (FIG. 3A), and an unfolded position (FIG. 3B). In the unfolded position, a vehicle 100 user may view an area exterior of the vehicle 100 through a mirror mounted to the housing. In the folded position, the housing 210 may be positioned substantially in parallel to a vehicle 100 door and/or an exterior surface of the vehicle 100 body 105. The mirror assembly 140 may include an actuator 120, e.g., an electric motor, etc., to move the housing 210 from the unfolded position to the folded position and/or vice versa. Additionally or alternatively, the foldable housing 210 could be manually movable from the unfolded position to the folded position and vice versa.

With reference to FIGS. 1, 2, 3A, and 3B, the housing 210 has a first surface 220 directed in a forward direction 185 when the foldable housing 210 is in the unfolded position. As shown in FIG. 1, the forward direction 185 refers to a vehicle 100 forward movement direction. The housing 210 has a second surface 230 that is a lateral side surface facing away from the anchor 200. The housing 210 has a third surface 240 (which also can be referred to as a hinged side surface) that is hingedly attached to the anchor element 200. The third surface 240 faces the vehicle 100 exterior when the housing 210 is in the unfolded position and faces forward when the housing 210 is in the folded position.

As discussed further below, capacitive sensing components may be included in the housing 210 of the mirror assembly 140 such that the housing 210 can additionally operate, in communication with the vehicle 100 computer 110, as an object detection sensor with capacitive fields 150, 160, 170 using capacitive sensing techniques. In one example, a first capacitive cover 250 and a first electric ground path 255 can be attached to the first surface 220, a second capacitive cover 260 and a second electric ground path 265 can be attached to the second surface 230, and a third capacitive cover 270 and a third electric ground path 275 attached to the third surface 240. Each of the capacitive covers 250, 260, 270 are electrically insulated from one another. In one example, a capacitive cover may be printed, sprayed, etc., on a mirror surface of the mirror assembly 140.

The capacitive covers 250, 260, 270 may be printed, sprayed, and/or sputtered on the housing 210. The capacitive material may be an electrically conductive material, e.g., conductive rubber, ionized metal, etc. The electric ground paths 255, 265, 275 may be printed, sprayed, and/or sputtered on the housing 210. In another example, a capacitive covers 250, 260, 270 may be formed of a metal plate attached to the housing 210.

In one example, as discussed further below, the first electric path 255 may substantially surround the first capacitive surface 250, the second electric ground path 265 may substantially surround the second capacitive surface 260, and the third electric ground path 275 may substantially surround the third capacitive surface 270. "Substantially surround" in this context means at least 80% of a perimeter of, e.g., the capacitive surface 250 is surrounded by the electric ground path 255. A point on a perimeter of the capacitive surface 250 is "surrounded" by the electric ground path 255 when a minimum distance from the point to the electric ground path 255 is less than a distance threshold, e.g., 2 centimeter (cm).

The capacitive covers 250, 260, 270 and electric ground paths 255, 265, 275 may be coupled to the vehicle 100 computer 110 via traces or electrodes connected to a vehicle 100 wiring harness. The electrodes may be sprayed or painted conductive materials such as conductive rubber, foam, etc., that couple the capacitive covers 250, 260, 270 and electric ground paths 255, 265, 275 to wires inside the housing 210. The wiring inside the housing 210 may be coupled to the vehicle 100 harness via pivotable electric connectors included in the assembly 140 that provide electrical connection through a hinged mechanical coupling of the housing 210 to the anchor 200. Additionally or alternatively, the capacitive covers 250, 260, 270 and/or electric ground paths 255, 265, 275 may be overmolded to the housing 210. Overmolding is a process where a single part is created using two or more different materials in combination. Typically the first material, sometimes referred to as the substrate, is partially or fully covered by subsequent materials (overmold materials) during the manufacturing process.

In one example, the housing 210 may be sprayed with a non-conductive primer paint prior to applying the capacitive covers 250, 260, 270 and electric ground paths 255, 265, 275, and/or the capacitive covers 250, 260, 270 and electric ground paths 255, 265, 275 may be covered by a non-conductive paint, e.g., a finish paint to provide the ordered exterior color of the housing 210. In another example, a capacitive cover 250, 260, 270 may be covered by a plastic cover, etc. In yet another example, a capacitive cover 250, 260, 270 may be attached, sprayed, etc. to an inner surface of the housing 210 instead of being attached or sprayed on an exterior surface of the housing 210.

As discussed above, the computer 110 can be programmed to use the capacitive covers 250, 260, 270 to detect objects 180 outside of the vehicle 100. The computer 110 can be programmed to determine respective capacitances of each of the capacitive covers 250, 260, 270 of the surfaces 220, 230, 240, and to actuate an actuator 120 to move the housing 210 to a folded position based on the determined respective capacitances.

With respect to FIG. 2, a first capacitance is between the first capacitance 250 and the first electric ground path 255, a second capacitance is between the second capacitance 260 and the second electric ground path 265, a third capacitance is between the third capacitance 270 and the third electric ground path 275.

Figure 4:
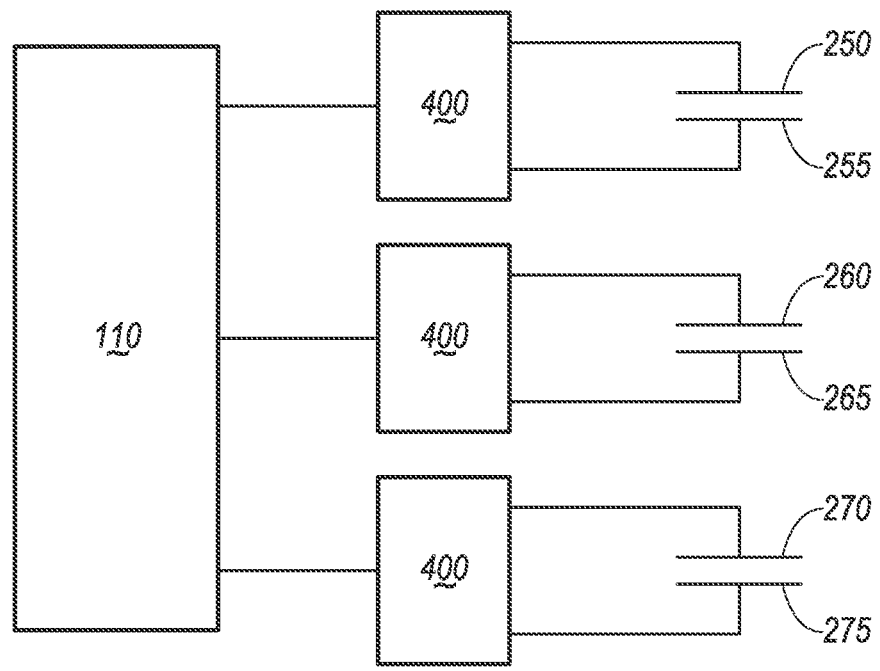
FIG. 4 shows an electric schematic including the computer, electric actuator circuits, the capacitive covers and electric ground paths.

FIG. 4 is an example electric schematic diagram showing the computer 110 electrically coupled to the capacitive covers 250, 260, 270 via electric actuator circuit(s) 400. The computer 110 may be programmed to actuate an electric actuator circuit 400 to electrically charge and discharge the capacitive covers 250, 260, 270, of the surfaces and to determine the capacitances of the covers 250, 260, 270 based on a determined rate of discharge of the capacitances. Rate of discharge is a rate of reduction of the voltage across a capacitor.

The electric actuator circuit 400 is a circuit including electric switching components such as field-effect transistors (FET) or the like to charge and discharge the capacitances of the capacitive covers 250, 260, 270. An electric actuator circuit 400 may charge and/or discharge a capacitive cover 250, 260, 270 upon receiving an instruction from the computer 110. Additionally, an electric actuator circuit 400 may include a circuit to drive an electric ground path 255, 265, 275. A driven ground circuit is an electric circuit that is typically added to reduce interference in reading low voltage signals.

Charging the capacitive covers 250, 260, 270 results in forming electric fields 150, 160, 170. As a result of charging a capacitor, electrical energy is stored in the capacitor. The energy supplied to the capacitor is stored in the form of an electric field 150, 160, 170 which is created between the plates of a capacitor, e.g., between the first capacitive cover 250 and the first electric ground path 255. When the voltage is applied across a capacitor, e.g., across the first capacitive cover 250 and the first electric ground path 255, an amount of charge accumulates on the first capacitive cover 250 and the first electric ground path 255.

A shape and/or dimensions of an electric field 150, 160, 170 may be based on a shape, dimensions, and/or relative positions of the capacitive covers 250, 260, 270 and the electric ground paths 255, 265, 275. With respect to FIG. 1, when the housing 210 is in unfolded position, the first electric field(s) 150 can extend toward a forward direction 185, the second electric field(s) 160 may extend toward the vehicle 100 body 105, and the third electric field(s) 170 may extend away from the anchor 200. In one example, the electric fields 150, 160, 170 may have a length that is one or more meters, e.g., substantially 3 meters, away from the housing 210.

A capacitance of a capacitor, e.g., a capacitance between the first capacitive cover 250 and the first electric ground path 255, may change when an object 180 enters the electric field 150. Objects 180 type, dimensions, location, direction of movement, etc., may be estimated using capacitive sensing techniques.

Figure 5:
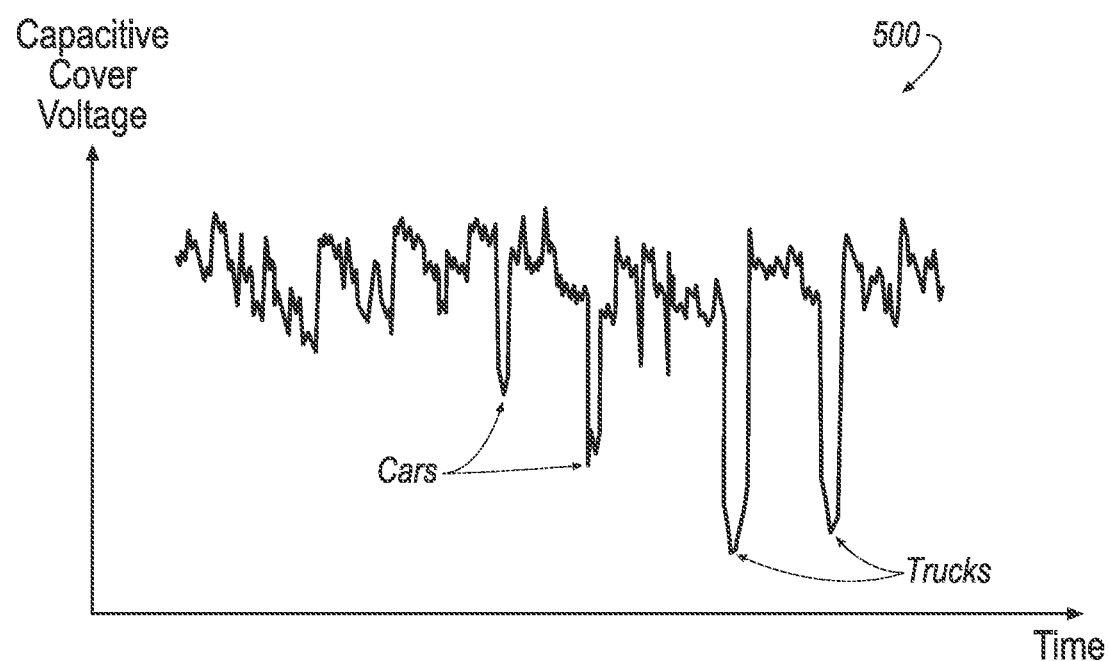
FIG. 5 shows a graph of changes of voltage of the capacitive covers.

The computer 110 determines a rate of discharge of covers 250, 260, 270 by iteratively sampling a voltage between, e.g., the first capacitive cover 250 and the first electric ground path 255. The computer 110 may include an analog-to-digital (ADC) converter circuit that converts the analog input electric voltage. FIG. 5 shows an example graph 500 of the voltage across, e.g., the first capacitive cover 250 and the first electric ground path 255. The graph 500 shows charging and discharging of the capacitive cover 250. As shown in the graph 500, a car and/or a truck entry to the electric field 150 may be detected based on a change of the discharge rate of the capacitor cover 250 and/or an amount of discharge of the capacitor cover 250, e.g., upon determining a rate of change of capacitance exceeding a threshold, as discussed below.

The computer 110 may be programmed to actuate the foldable housing 210 to fold upon determining that a rate of change of the determined capacitance is less than a first threshold and greater than a second threshold. A rate of change of the capacitance may indicate a speed of the object 180. The first rate of change of capacitance may indicate noise, etc. Thus, a rate of change greater than a first threshold may be ignored, as a folding of the housing 210 may be unnecessary. Thus, in other words, the first threshold is a threshold for preventing a folding of the housing 210 and the second threshold is a threshold for actuating the housing 210 to fold. Alternatively, although not shown in FIGS. 1 and 6, an object 180 may move toward the housing 210 in a forward direction 185 or the vehicle 100 may move backward in a reverse gear. In either of these examples, the computer 110 may be programmed to actuate the foldable housing 210 to fold upon determining that a rate of change of the determined capacitance is less than a first threshold and greater than a second threshold.

In yet another example, the computer 110 may be programmed to store locations, e.g., global positioning system (GPS) coordinates, where obstacle(s) 180 cause the housing 210 to fold, e.g., at a drive-through restaurant location. In one example, the computer 110 may be programmed to store a location for folding the housing 210 upon determining that the computer 110 has actuated to fold the housing 210 at the respective location more than a threshold number of times, e.g., 90% of times at the location. In other words, upon determining that at least 90% of times (e.g., 9 out of last 10 times) at a GPS location the housing 210 was folded, the computer 110 may store the GPS location coordinates in a computer 110 memory, and the computer 110 may be programmed to then actuate the housing 210 to fold upon determining based on GPS sensor data that the vehicle 100 is within a distance threshold, e.g., 10 meters, of a location stored in the computer 110 memory for folding the housing 210.

To prevent false detections of objects 180, for example, the computer 110 may be programmed to determine whether to fold the housing mirror 210 only after first determining whether a set of preconditions are satisfied. Then, upon determining that the preconditions are satisfied, then the computer 110 may be programmed to determine whether the rate of change of a capacitance is greater than the second threshold, and then, only upon determining that the rate of change of a capacitance is greater than the second threshold, actuate the actuator 120 to fold the housing 210. In one example, the computer 110 may be programmed to determine that the preconditions are satisfied upon determining that (i) a vehicle 100 user key fob (or transponder) is outside a distance threshold, e.g., 5 meters, of the vehicle 100, (ii) a rate of change of less than the first threshold, and (iii) a vehicle 100 speed is less than a threshold, e.g., 5 kilometer/hour (kph). Thus, the computer 110 may be programmed to prevent an actuation of the foldable housing 210 upon determining that a vehicle 100 speed exceeds a threshold.

Figure 6:
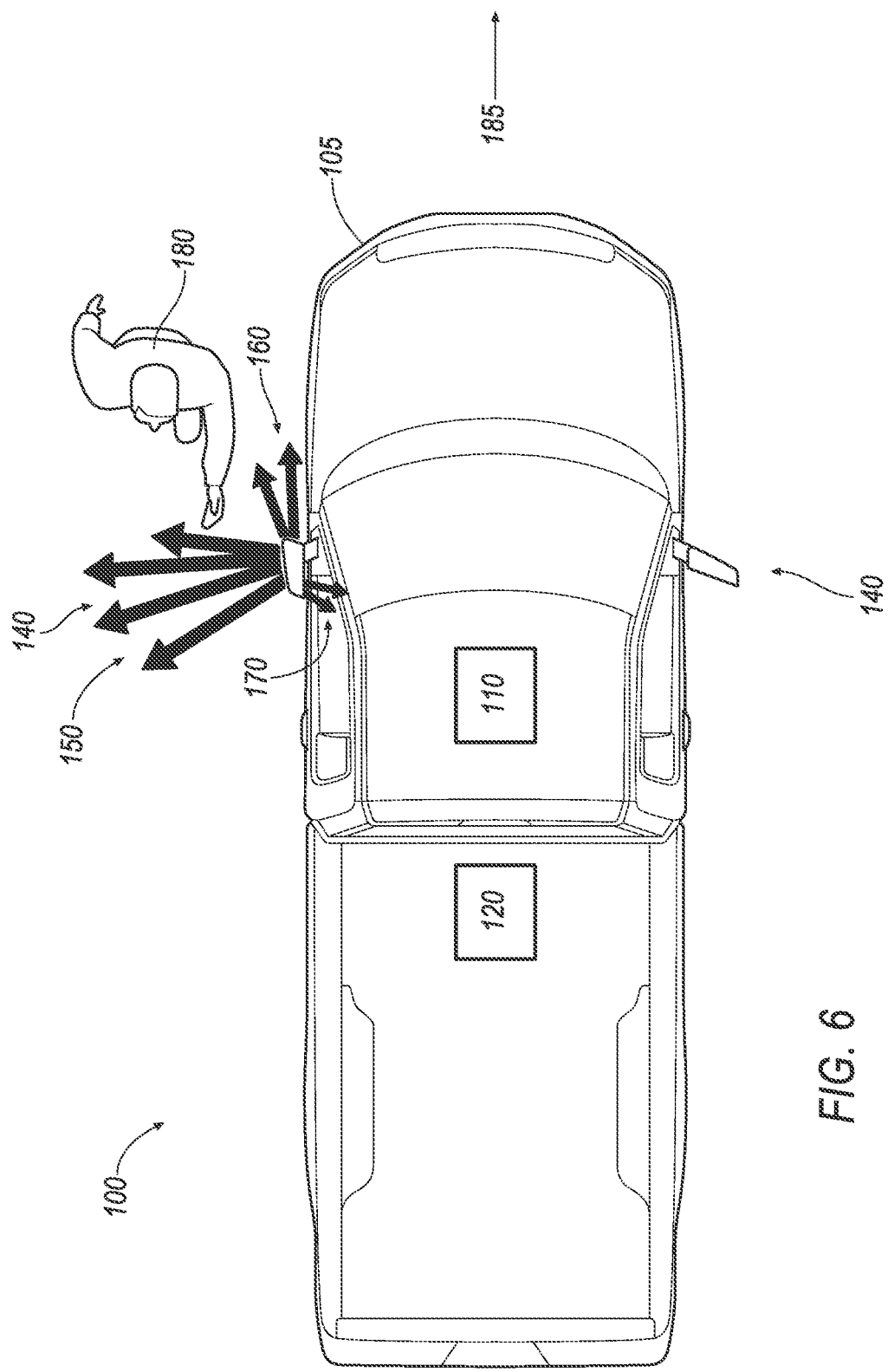
FIG. 6 shows the vehicle of FIG. 1 with the side-view mirror in the folded position.

As discussed above, the computer 110 may determine a capacitance of each of the capacitive covers 250, 260, 270. The computer 110 may be programmed to fold or unfold the housing 210 based on capacitances of at least one of the capacitive covers 250, 260. In one example, as shown in FIG. 6, the computer 110 may actuate the housing 210 to fold based on determining that (i) a first rate of change of capacitance of the first cover 250 is greater than a second threshold, or (ii) a second rate of change of capacitance of the second cover 260 is greater than a second threshold. Because dimensions, location, etc., of the covers 250, 260 differ, the second threshold for the first and second capacitive covers 250, 260 may differ. In one example, the computer 110 may store a first and a second rate of change threshold for each of the covers 250, 260, 270 in a computer 110 memory, e.g., in a table, array, etc.

As shown in FIG. 6, when the mirror housing 210 is in the folded position, an object 180 may move near the vehicle 100, e.g., less than a distance threshold such as 30 centimeter (cm) to the housing 210. In one example, the computer 110 may be programmed to actuate a vehicle 100 actuator 120 to stop based on determined capacitance of the third capacitive cover 270 while the foldable housing 210 is in the folded position.

Moisture on the capacitive covers 250, 260, 270, e.g., caused by rain, typically changes the capacitances of the covers 250, 260, 270. In contrast to a change of the capacitance caused by moving object(s) 180, a change of the capacitance caused by moisture may be at a constant and/or slower rate. The computer 110 may be programmed to detect water on the housing 210 based on the determined capacitance and a rate of change of the capacitance. Thus, as discussed below, the computer 110 may detect that the cover(s) 250, 260, 270 upon detecting a rate of change of capacitance that is less than a threshold for at least one of the covers 250, 260, 270 and the capacitances of the covers 250, 260, 270. In other words, a capacitance exceeding a threshold while no significant change of capacitance (i.e., a rate of change of the capacitance is less than the threshold) is detected, may cause a determination of water or moisture on the respective surface 250, 260, 270. A rate of change threshold and a capacitance threshold may be determined based on empirical methods, e.g., measuring a capacitance of the wet cover 250, 260, 270 and determining 80% of the measured value as the threshold.

The computer 110 may store in a computer 110 memory a typical capacitance of each of the covers 250, 260, 270 under dry conditions. Thus, the computer 110 may determine that a cover 250, 260, 270 is wet based on a difference of a measured capacitance and stored capacitance of a respective cover 250, 260, 270. For example, a cover 250, 260, 270 may have a capacitance of 2 pico farad (pf) under a dry-condition, and the capacitance may increase by 0.8 pf when the cover 250, 260, 270 is wet. In one example, the computer 110 may determine that the cover 250, 260, 270 is wet upon determining that the capacitance of the cover 250, 260, 270 exceeds 2.5 pf.

A vehicle 100 may include a running board, e.g., to provide a step for people entering and exiting a taller vehicle 100, e.g., a pickup truck. A running board may have a deployed (or dropped) position and a retracted position. The vehicle 100 may include an actuator 120 for deploying (i.e., changing from retracted to deployed position) the running boards based on a command from the vehicle 100 computer 110. As running boards may become dusty and dirty, a running board may be placed in the deployed position when a vehicle 100 is moving, e.g., in a car wash.

In one example, the computer 110 may be programmed to actuate a vehicle 100 running board to drop (or deploy) upon (i) determining that a vehicle 100 gear is on a neutral position, (ii) detecting water on the right side-view mirror housing 210, (iii) detecting water on the left side-view mirror housing 210, and/or (iv) the vehicle 100 is moving. The computer 110 may be programmed to determine that the vehicle 100 is moving upon determining that a vehicle 100 wheel speed is greater than a threshold, e.g., 2 kilometer per hour (kph). Alternatively, the computer 110 may be programmed to retract the running board in a car wash to prevent any damage to the running board. In this example, the computer 110 may be programmed to actuate a vehicle 100 running board to retract (i.e., move to the retracted position) upon (i) determining that a vehicle 100 gear is on a neutral position, (ii) detecting water on the right side-view mirror housing 210, (iii) detecting water on the left side-view mirror housing 210, and/or (iv) the vehicle 100 is moving.

Figure 7A:
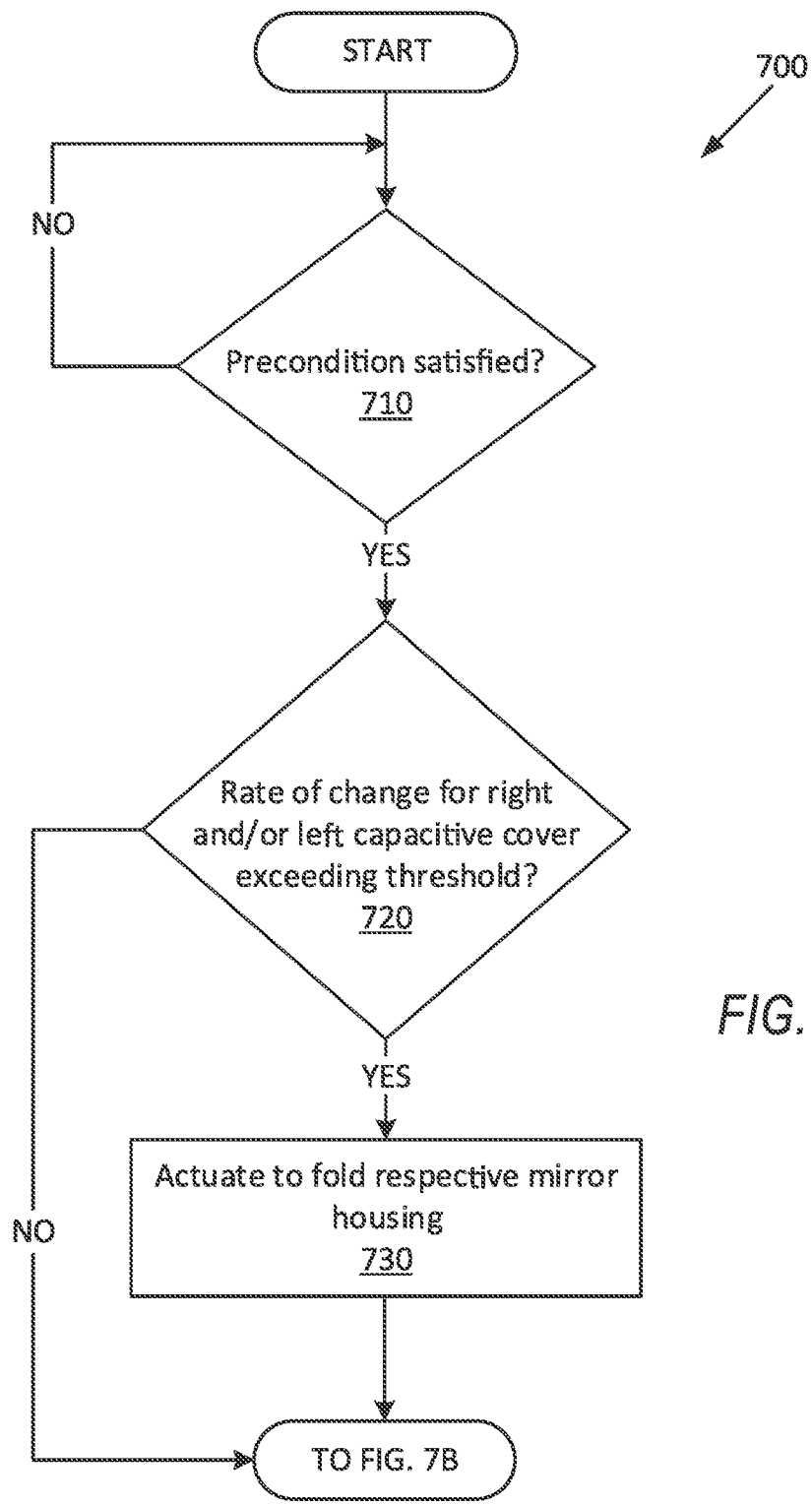
FIGS. 7A-7B are a process for controlling side-view mirror housing(s) and a running board of a vehicle.
Figure 7B:
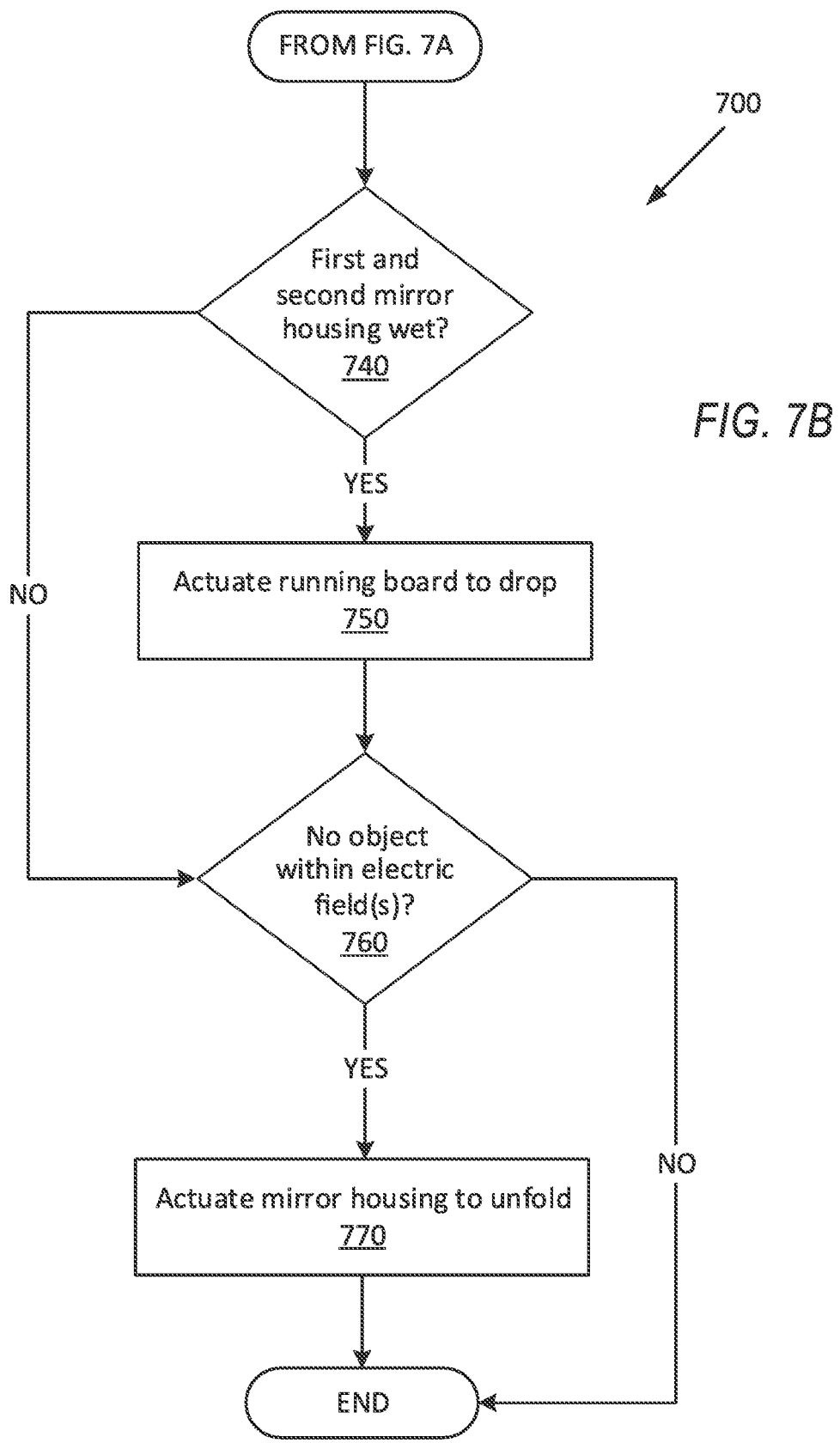

FIGS. 7A-7B are a flowchart of a process 700 for controlling mirror housing(s) 210 and a running board of a vehicle 100. The computer 110 may be programmed to execute blocks of the process 700.

The process 700 begins in a decision block 710, in which the computer 110 determines whether one or more preconditions are satisfied. For example, the computer 110 may be programmed to receive vehicle 100 speed data, e.g., from a vehicle 100 speed sensor, and determine that the precondition is satisfied upon determining that the vehicle 100 speed is less than a speed threshold, e.g., 5 kph. Additionally or alternatively, the computer 110 may determine that the precondition is satisfied upon determining that a vehicle 100 user key fob is more than a threshold distance threshold, e.g., 5 m, from an exterior surface of the vehicle 100 body 105.

Additionally or alternatively, the computer 110 may be programmed to determine that the precondition is satisfied upon determining that the rate of change of capacitance of a cover 250, 260, 270 exceeds a first threshold. If the computer 110 determines that the precondition(s) is/are met, then the process 700 proceeds to a decision block 720; otherwise the process 700 returns to the decision block 710.

In the decision block 720, the computer 110 determines whether a rate of change of a capacitance of a cover 250, 260 of the right and/or left mirror housing 210 exceeds the second threshold. The computer 110 may be programmed to determine that a capacitance of the right side-view mirror housing 210 exceeds the second threshold upon determining that a capacitance of at least one of a first and second capacitive covers 250, 260 of the right mirror housing 210 exceeds the second threshold. The computer 110 may be programmed to determine that a capacitance of the left side-view mirror housing 210 exceeds the second threshold upon determining that a capacitance of at least one of a first and second capacitive covers 250, 260 of the left mirror housing 210 exceeds the second threshold. If the computer 110 determines that the rate of change of the capacitance of the right and/or left mirror housing 210 exceeds the second threshold, then the process 700 proceeds to a block 730; otherwise the process 700 proceeds to a decision block 740 (FIG. 7B).

In the block 730, the computer 110 actuates the actuator 120 to fold the mirror housing(s) 210 indicated in the block 720. For example, upon determining in decision block 720 that a capacitance of a cover 250, 260 of the right mirror housing 210 exceeds the second threshold, then the computer 110 may actuate the actuator 120 of the right mirror housing 210 to fold the right mirror housing 210. In another example, upon determining that the capacitances of the right and left mirror housings 210 exceed the second threshold, the computer 110 may actuate the actuators 120 of the right and left mirror housings 210 to move the right and left mirror housings 210 to the folded position.

Turning to the FIG. 7B, in the decision block 740, the computer 110 determines whether the right and left mirror housings 210 are wet. If the computer 110 determines that the right and left mirror housings 210 are wet, then the process 700 proceeds to a block 750; otherwise the process 700 proceeds to a decision block 760.

In the block 750, the computer 110 actuates the running board to deploy. The computer 110 may be programmed to actuate an actuator 120 to move the running board to the deployed position.

Next, in a decision block 760, the computer determines whether no object 180 is within the electric field 150, 160. The computer 110 may be programmed to determine whether the rate of change of capacitance of the covers 250, 270 is less than the second threshold. In the folded position, the electric field 170 of the capacitive cover 260 is extended toward a vehicle 100 interior, therefore the computer 110 may ignore the capacitance data of the capacitive cover 260 while the housing 210 is in the folded position. If the computer 110 determines that that no object 180 is within the electric fields 150, 160, then the process 700 proceeds to a block 770; otherwise the process 700 ends, or alternatively returns to the decision block 710, although not shown in FIGS. 7A-7B.

In the block 770, the computer 110 actuates the mirror housing to unfold. The computer 110 may be programmed to actuate the actuator 120 in the respective mirror housing 210 to move the housing 210 from the folded position to the unfolded position. Following the block 770, the process 700 ends, or alternatively returns to the decision block 710, although not shown in FIGS. 7A-7B.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle side-view mirror assembly, comprising:
an anchor element mountable to a vehicle exterior; and
a foldable housing, including:
   a first surface directed in a forward direction when the foldable housing is in an unfolded position;
   a first capacitive cover and a first electric ground path attached to the first surface;
   a second surface that is a lateral side surface facing away from the anchor element;
   a second capacitive cover and a second electric ground path attached to the second surface;
   a third surface that is a hinged side surface hingedly connected to the anchor element; and
   a third capacitive cover and a third electric ground path attached to the third surface;
   wherein each of the capacitive covers are electrically insulated from one another.

2. The vehicle side-view mirror assembly of claim 1, wherein the hinged side surface faces a vehicle exterior surface when the housing is in the unfolded position and faces forward when the housing is in a folded position.

3. The vehicle side-view mirror assembly of claim 1, wherein the capacitive covers and the electric ground paths are electrically coupled to a vehicle computer.

4. The vehicle side mirror assembly of claim 1, wherein the capacitive covers and the electric ground paths are covered with paint.

5. A system, comprising:
a side-view mirror assembly, comprising:
   an anchor element mountable to a vehicle exterior; and
   a foldable housing, including:
      a first surface directed in a forward direction when the foldable housing is in an unfolded position;
      a first capacitive cover and a first electric ground path attached to the first surface;
      a second surface that is a lateral side surface facing away from the anchor element;
      a second capacitive cover and a second electric ground path attached to the second surface;
      a third surface that is a hinged side surface hingedly connected to the anchor element; and
      a third capacitive cover and a third electric ground path attached to the third surface;
      wherein each of the capacitive covers are electrically insulated from one another; and
a computer comprising a processor and a memory, the memory storing instructions executable by the processor to:
   determine respective capacitances of each of the capacitive covers of the surfaces; and
   actuate an actuator to move the housing to a folded position based on the determined respective capacitances.

6. The system of claim 5, wherein the instructions further include instructions to prevent an actuation of the foldable housing upon determining that a vehicle speed exceeds a threshold.

7. The system of claim 5, wherein the instructions further include instructions to actuate the foldable housing to fold upon determining that a rate of change of the determined capacitance is less than a first threshold and greater than a second threshold.

8. The system of claim 5, wherein the instructions further include instructions to detect water on the housing based on the determined capacitance and a rate of change of the capacitance.

9. The system of claim 8, wherein the instructions further include instructions to actuate a vehicle running board to drop upon (i) determining that a vehicle gear is in a neutral position, (ii) detecting water on the foldable housing, and (iii) detecting water on a second foldable housing mounted to the vehicle.

10. The system of claim 5, wherein the instructions further include instructions to actuate a vehicle actuator to stop based on determined capacitance of the hinged side surface while the foldable housing is in the folded position.

11. The system of claim 5, wherein the instructions further include instructions to actuate the foldable housing to move to the folded position based on capacitances of the capacitive covers of at least one of the forward-facing surface and the lateral side surface.

12. The system of claim 5, wherein the instructions further include instructions to actuate an electric actuator to electrically charge and discharge the capacitive covers of the surfaces and to determine the capacitances of the covers based on a determined rate of discharge of the capacitances.

13. The system of claim 5, wherein the instructions further include instructions to actuate the actuator to move the housing to the folded position further based on location coordinates stored in the memory.

14. The system of claim 13, wherein the instructions further include instructions to store location coordinates in the memory upon determining that the housing was actuated to fold for at least a specified number of times at the respective location.

* * * * *